(12) United States Patent
Sharp et al.

(10) Patent No.: US 11,298,933 B2
(45) Date of Patent: Apr. 12, 2022

(54) PRINTING SYSTEM AND METHOD INCLUDING MAGNETIC COUPLING DEVICE

(71) Applicant: TONEJET LIMITED, Royston (GB)

(72) Inventors: John Lawton Sharp, Cambridge (GB); Ian Philip Butler Ingham, Cambridge (GB); Jeffrey Mark Woods, Cambridge (GB); Simon John Edwards, Cambridge (GB); Andrew John Clippingdale, Cambridge (GB); Jonathan James Michael Halls, Cambridge (GB)

(73) Assignee: Tonejet Limited, Royston (GB)

( * ) Notice: Subject to any disclaimer, the term of this patent is extended or adjusted under 35 U.S.C. 154(b) by 426 days.

(21) Appl. No.: 16/346,199

(22) PCT Filed: Nov. 2, 2017

(86) PCT No.: PCT/EP2017/078035
§ 371 (c)(1),
(2) Date: Apr. 30, 2019

(87) PCT Pub. No.: WO2018/083163
PCT Pub. Date: May 11, 2018

(65) Prior Publication Data
US 2019/0291406 A1 Sep. 26, 2019

(30) Foreign Application Priority Data

Nov. 2, 2016 (EP) ..................................... 16196961
Nov. 2, 2016 (EP) ..................................... 16196962
(Continued)

(51) Int. Cl.
B41J 3/407 (2006.01)
B41F 17/18 (2006.01)
(Continued)

(52) U.S. Cl.
CPC ............ *B41F 17/002* (2013.01); *B41F 17/18* (2013.01); *B41F 17/20* (2013.01); *B41J 3/4073* (2013.01);
(Continued)

(58) Field of Classification Search
CPC .......................... B41J 3/40731; B41J 3/40733
See application file for complete search history.

(56) References Cited

FOREIGN PATENT DOCUMENTS

| CN | 2563354 Y | 7/2003 |
|---|---|---|
| CN | 101003224 A | 7/2007 |

(Continued)

OTHER PUBLICATIONS

International Search Report and Written Opinion in Appl. No. PCT/EP2017/078035 dated Dec. 11, 2017, 12 pages.
(Continued)

*Primary Examiner* — Leslie J Evanisko
(74) *Attorney, Agent, or Firm* — Kowert, Hood, Munyon, Rankin & Goetzel, P.C.

(57) ABSTRACT

A system for transmitting rotational motion between a driving element and a driven element comprises a driving element that is coupled to a torque input that causes the driving element to rotate about a drive axis. The driving element comprises a first magnetic element. A driven element is configured to rotate about a driven axis. The driven element comprises a second magnetic element. Both the first magnetic element and second magnetic element are susceptible to a magnetic field, and at least one of the first and second magnetic element produces a magnetic field. A magnetic interaction between the first magnetic element and the second magnetic element couples the rotational motion of the driving element and the rotational motion of the (Continued)

driven element. The driving and driven elements are coupled at a predetermined rotational orientation with respect to each other.

29 Claims, 5 Drawing Sheets

(30) Foreign Application Priority Data

Nov. 2, 2016 (EP) .................................. 16196963
Nov. 2, 2016 (EP) .................................. 16196965

(51) Int. Cl.
*B41F 17/00* (2006.01)
*B41F 17/20* (2006.01)
*F16D 27/01* (2006.01)
*B41J 11/00* (2006.01)

(52) U.S. Cl.
CPC ......... *B41J 3/40733* (2020.08); *B41J 11/002* (2013.01); *F16D 27/01* (2013.01)

(56) References Cited

FOREIGN PATENT DOCUMENTS

| | | | |
|---|---|---|---|
| CN | 202260967 U | 5/2012 | |
| CN | 105008133 A | 10/2015 | |
| CN | 204961629 U | 1/2016 | |
| CN | 105958791 A | 9/2016 | |
| DE | 1075903 | 2/1960 | |
| EP | 2842747 A1 * | 3/2015 | ............. B41F 17/28 |
| JP | H07-308060 A | 11/1995 | |
| JP | 2015-229377 A | 12/2015 | |
| WO | 2013123464 | 8/2013 | |
| WO | 2014076704 | 5/2014 | |
| WO | 2014126447 | 8/2014 | |
| WO | WO-2019130667 A1 * | 7/2019 | ............ B41J 3/4073 |

OTHER PUBLICATIONS

Office Action in European Appl. No. 17791423.1 dated Feb. 10, 2021, 8 pages.
Office Action in Chinese Appl. No. 201780068112.2 dated Aug. 20, 2020, 14 pages.
Office Action in Japanese Appl. No. 2019-517992 dated Jul. 9, 2021, 7 pages.

* cited by examiner

Figure 2A   Figure 2B   Figure 2C   Figure 2D
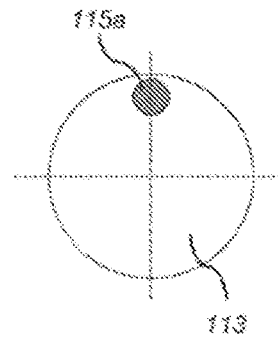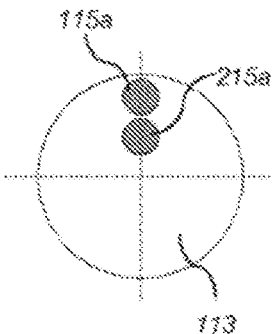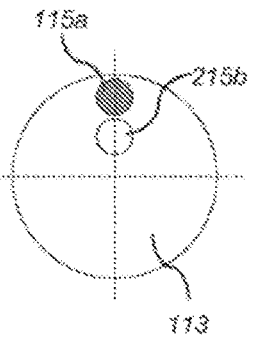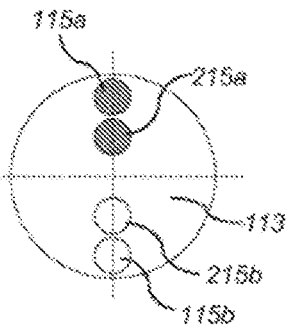
Drive disc shown. Driven disk is mirror-image.
Figure 3
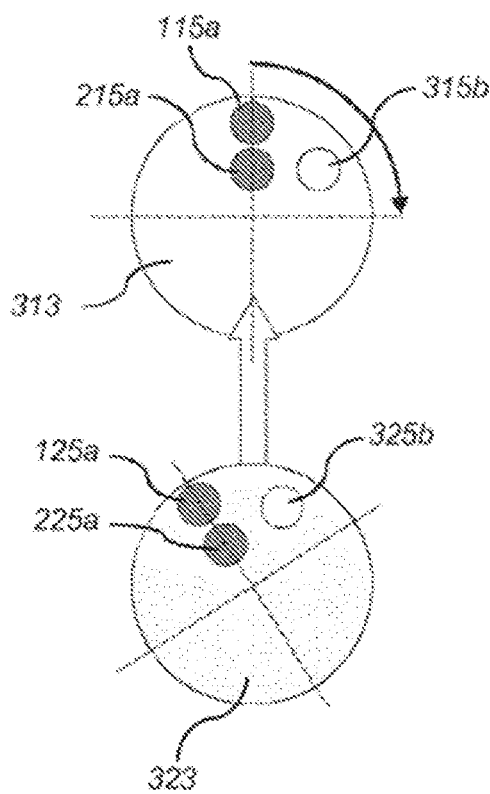
Drive disk viewed from front
Driven disk viewed from behind

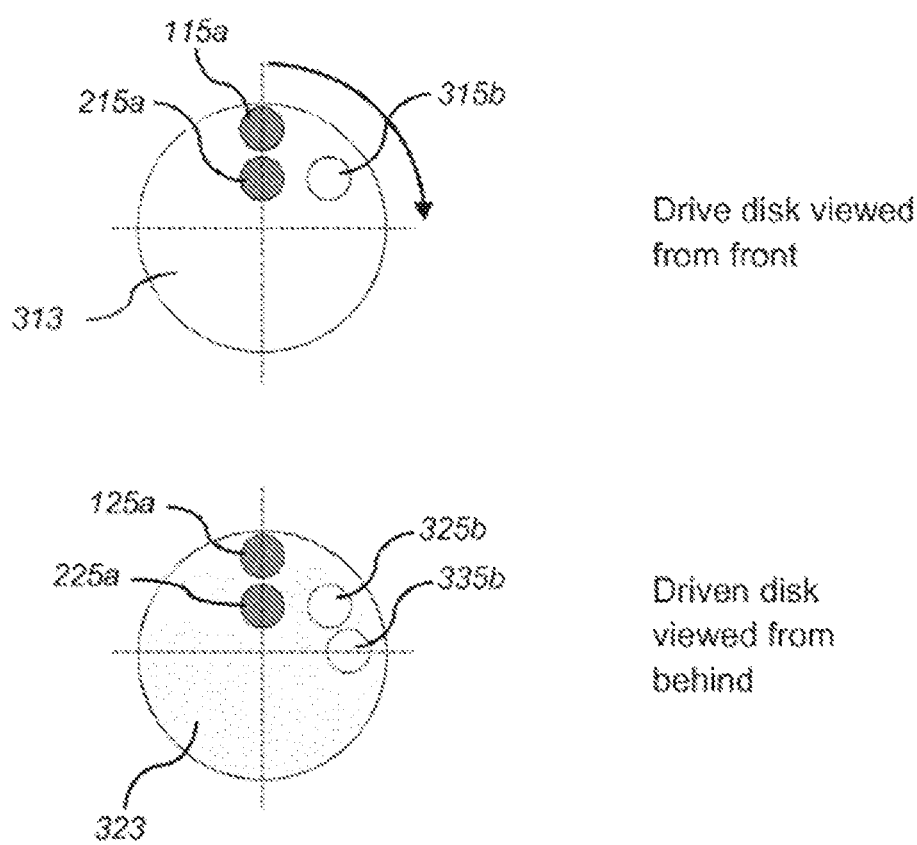

Figure 5A
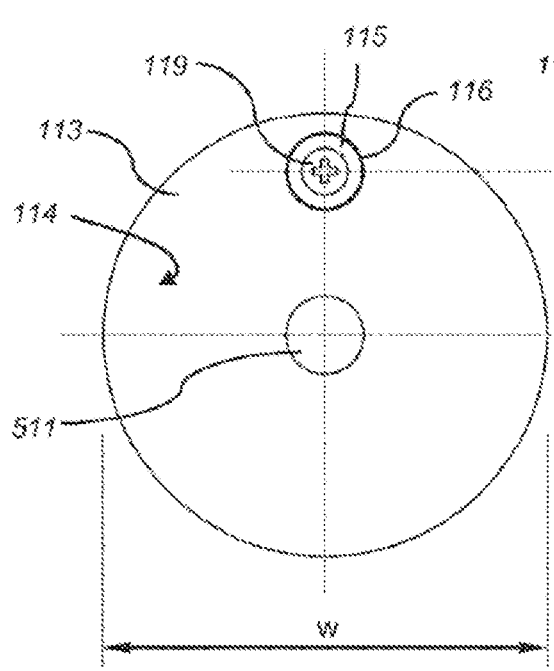
Figure 5B
Figure 5C
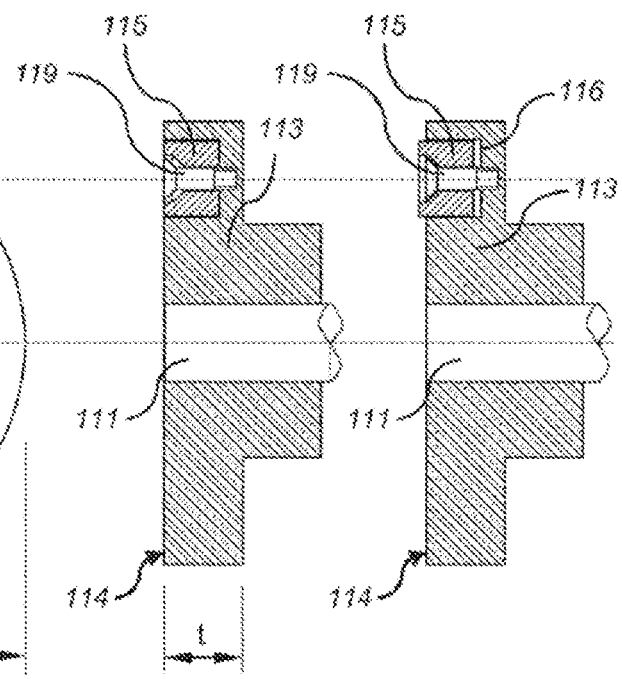
Figure 6A
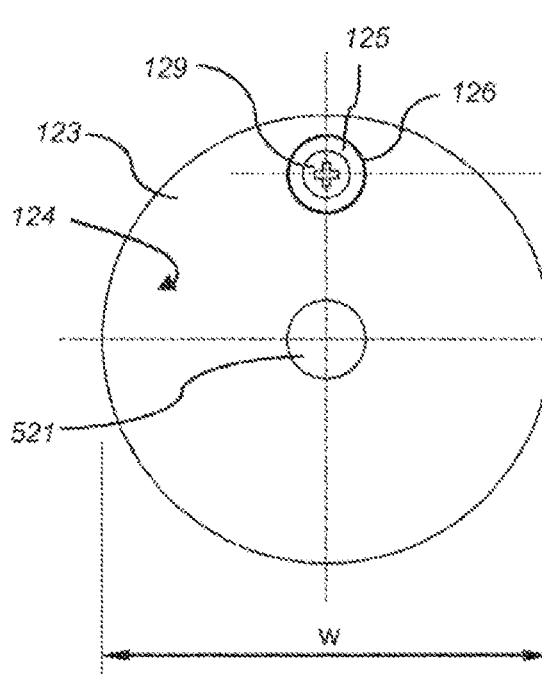
Figure 6B
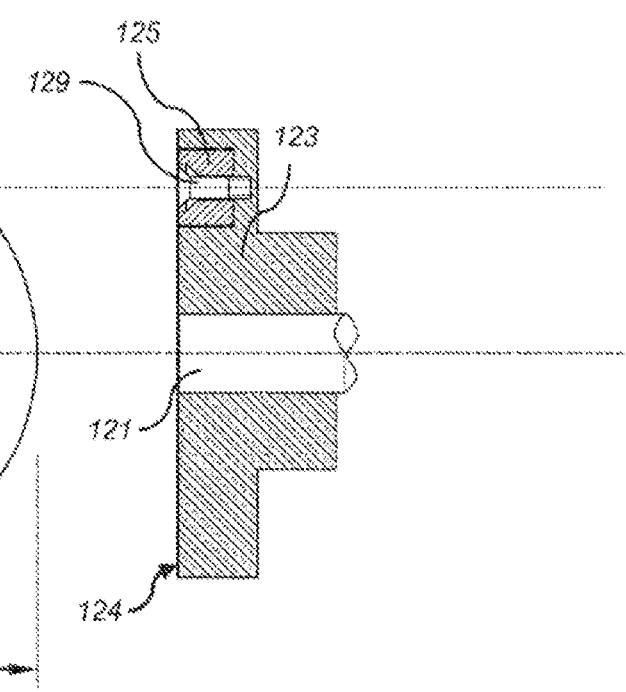

PRINTING SYSTEM AND METHOD INCLUDING MAGNETIC COUPLING DEVICE

The present invention relates to a system for synchronizing the angular rotation of a passive driven element with a powered driving element using a magnetic coupling.

BACKGROUND

There are many examples of apparatuses in which angular momentum is selectively transferred from a driving rotating system to a driven rotating system.

In certain simple examples, the requirements of the coupling mechanism require only that the two systems are able to be selectively engaged and disengaged from each other. Such systems include automobile clutch systems which require that a driven shaft is selectively engaged and disengaged from a driving shaft powered by an engine.

In other apparatuses, the relationship between the driving system and the driven system may be more complex, requiring, for example, that the driven system is moveable from the vicinity of the driving system or that the relative degrees of rotation of the two systems are fixed at a certain predetermined position.

An example of such a complex system is a printing apparatus that comprises a plurality of holding devices that are moved from station to station along a track. The holding devices comprise passive rotatable sections, which are rotationally driven by driving devices positioned at various stations along the track. In some examples of this printing apparatus, it is advantageous for the orientation (i.e. degree of rotation) of the driven system to be derivable from the orientation of the driving system; this allows rotational control of the driven system to be performed entirely through control of the driving system.

There are a number of known apparatuses that allow angular rotation to be transmitted from a driving system to a passive driven system.

One example of a type of known apparatus is that of clutch systems (e.g. friction clutches, dog clutches, hydraulic clutches, centrifugal clutches and electromagnetic clutches). In such systems a driven rotating element and a driving rotating element are generally provided at positions that, apart from allowing for some movement in the axial direction of the rotating elements, are fixed with respect to each other; generally, it is not possible in these systems to move the axes of the passive and driving elements out of alignment. Another disadvantage of these systems is that the driven and driving elements are generally designed such that they may engage in any rotational orientation with respect to the other and may be designed to slip when partially engaged; there is, therefore, no necessary relationship between the orientation of the driving element and the orientation of the driven element.

Other examples of coupling systems (for example Oldham couplings, universal joints, and jaw couplings) permit some degree of angular and/or translational misalignment between the driving and driven elements, but do not allow these elements to disengage from each other entirely. Such systems are not, therefore, suitable for use in an apparatus in which the driven element is to be moved away from the vicinity of the driving element.

Further examples of coupling systems are of geared systems, in which translation of one shaft relative to another causes gears to mesh together, and magnetic shaft couplings, in which multiple north-south magnet pairs urge driven and driving elements into alignment. Such systems do not, however, have a unique engaged position, so the orientation of the driven system is not derivable from the orientation of the driving system.

There is a need, therefore, for a coupling system that is able to transmit angular motion from a rotating driving element to a passive driven element and that overcomes the above described limitations of known devices.

SUMMARY OF INVENTION

In a first aspect of the invention a system for transmitting rotational motion between a driving element and a driven element is provided, the system comprising: a driving element that is coupled to a torque input that causes the driving element to rotate about a drive axis, the driving element comprising a first magnetic element; a driven element that is configured to rotate about a driven axis, the driven element comprising a second magnetic element; both the first magnetic element and second magnetic element are susceptible to a magnetic field, and at least one of the first and second magnetic element produces a magnetic field; wherein the driving element and the driven element are configured such that, when in a drive position in which the drive axis is aligned with the driven axis, a magnetic interaction between the first magnetic element and the second magnetic element couples the rotational motion of the driving element and the rotational motion of the driven element.

The system comprising the above features enables a coupling system in which the driving element and the driven element are completely separable from each other and in which the orientation of the driven element can be derived from the orientation of the driving element.

Preferably, the predetermined rotational orientation is a unique rotational orientation of the driving element with respect to the driven element in which the first and second magnetic elements are aligned along an axis parallel with the drive axis and the driven axis.

Preferably, the driven element is mounted on a carrying device that is transportable along a path, wherein the path requires that the carrying device moves the driven element into and out of the drive position in a direction substantially perpendicular to the drive axis of the drive device.

Preferably, at least one of the first magnetic element and the second magnetic element is a permanent magnet.

Preferably, at least one of the first magnetic element and the second magnetic element comprises a ferromagnetic material.

Preferably, the first magnetic element is disposed in the driving element at a radial distance, r, from the drive axis and the second magnetic element is disposed in the driven element at the same radial distance, r, from the driven axis.

Preferably, at least one of the first magnetic element or the second magnetic element is disposed in a cavity in the driving element or the driven element respectively, and, preferably, wherein the second magnetic element is retained in the cavity by a retaining element that allows the second magnetic element to move in a direction parallel to the driven axis, thereby allowing the second magnetic element to move so as to contact the surface of the driving element when in the drive position, and, more preferably, wherein the first magnetic element is retained in the cavity by a retaining element that allows the first magnetic element to move in a direction parallel to the drive axis, thereby allowing the first magnetic element to move so as to contact the surface of the driven element when in the drive position.

Preferably, the driving element and the driven element each comprises a plurality of magnetic elements that are arranged such that the positions and/or magnetic polarities of the magnetic elements are asymmetrical around the drive axis and driven axis respectively, thereby providing one predetermined rotational orientation.

Preferably, the position of each magnetic element on the driving element aligns with the position of a corresponding magnetic element on the driven element when the driving and the driven elements are aligned in the one predetermined rotational orientation.

Preferably, at least one further magnetic element is positioned on at least one of the driving or the driven elements with no corresponding further magnetic element on the other of the driving or driven elements.

Preferably, the driven element is one of a plurality of driven elements that are moveable such that each driven element sequentially couples and decouples with the driving element.

Preferably, the driving element is one of a plurality of driving elements, and wherein the driven element may sequentially move into drive positions respectively associated with each of the driving elements such that the rotational motion between the driving elements and the driven element is coupled in the respective drive positions.

Preferably, wherein the driving element comprises a drive disc in which the first magnetic element is disposed, and wherein the driven element comprises a driven disc in which the second magnetic element is disposed.

In some embodiments, the drive position is fixed.

In other embodiments, the drive position is moveable in a direction parallel to the path of the carrying device to enable the driven element to remain coupled to the driving element during part of its movement along the path.

Preferably, the driving element comprises a first face that lies substantially in a plane perpendicular to the drive axis, and the driven element comprises a second face that lies substantially in a plane perpendicular to the driven axis, and wherein, in the drive position, the first face and the second face are substantially parallel and oriented in a face-to face relationship.

Preferably, the first magnetic element and or the second magnetic element are magnetized such that, when the driving element and the driven element are in the drive position, the first and second magnetic elements attract each other.

Preferably, at least one of the first magnetic element and the second magnetic element is an electromagnet.

In a second aspect of the invention, a printing apparatus is provided comprising at least one printing station comprising a print head; and at least one system according to the first aspect of the invention.

In a third aspect of the invention, there is provided a method of operating the device according to the first aspect, the method comprising: rotating the driving element around the drive axis using the torque input; moving the driven element in a direction perpendicular to the drive axis into the drive position, thereby causing the rotational motion of the driven element to be coupled with the rotational motion of the driving element.

The above method provides a method of coupling the system of the first aspect in which the driving and driven elements are brought into the vicinity of each other in a direction perpendicular to their axes of rotation. This allows the forces between the magnetic elements of the two devices to produce a large torque about the rotational axes and thereby improve the reliability of the coupling process.

The drive position may be a fixed position or may be moveable. The drive position may, for example, track the motion of the driven element in a direction perpendicular to the drive axis over a certain range of movement in order for the driven element to remain coupled to the driving element during part of its movement perpendicular to the drive axis.

Preferably, the method comprises moving the driven element out of the drive position in a direction perpendicular to the drive axis, thereby decoupling the rotational motion of the driven element from the rotational motion of the driving element; rotating a second driving element around a second drive axis using the torque input; moving the driven element into a second drive position in which the driven axis is aligned with the second drive axis, thereby coupling the rotational motion of the driven element to the rotational motion of the second driving element.

Preferably, the moving of the driven element out of the drive position in a direction perpendicular to the drive axis is synchronised with the rotational motion of the driving element so that the act of moving the driven element out of the drive position imparts an angular acceleration to the driven element.

Preferably, prior to moving the driven element out of the drive position the rotation of the driving element is accelerated to impart an angular acceleration to the driven element.

Preferably, the angular acceleration imparted to the driven element compensates for its deceleration between drive positions due to drag and friction.

Preferably, rotational motion is imparted to the driven element prior to coupling with the driving element.

Preferably, the rotational motion is imparted by the rolling contact of the driven element with a stationary pad or rail.

In a fourth aspect of the invention, a printing system is provided comprising a driving element that is disposed at a stationary location beside a track and a driven element that is configured to carry an object to be printed on and to move along the track, wherein: the driving element is coupled to a torque input that causes the driving element to rotate about a drive axis, the driving element comprising a first magnetic element; the driven element is configured to rotate about a driven axis, the driven element comprising a second magnetic element; wherein both the first magnetic element and second magnetic element are susceptible to a magnetic field, and at least one of the first and second magnetic element produces a magnetic field; wherein the driving element and the driven element are configured such that, when in a drive position in which the drive axis is aligned with the driven axis, a magnetic interaction between the first magnetic element and the second magnetic element couples the rotational motion of the driving element and the rotational motion of the driven element.

BRIEF DESCRIPTION OF THE FIGURES

FIG. 2A shows a schematic representation of the position of the magnetic element in the embodiment of FIGS. 1A and 1B.

FIG. 2B shows a schematic representation of the arrangement of magnetic elements in a second embodiment.

FIG. 2C shows a schematic representation of the arrangement of magnetic elements in a third embodiment.

FIG. 2D shows a schematic representation of the arrangement of magnetic elements in a further embodiment.

FIG. 3 shows a schematic representation of the arrangement of magnetic elements in a fourth embodiment.

FIG. 4 shows a schematic representation of the arrangement of magnetic elements in a fifth embodiment.

FIG. 5A shows a view of a drive disc in some embodiments of the invention.

FIG. 5B is a cross-section of a drive disc in some embodiments of the invention.

FIG. 5C is a cross-section of a drive disc in some embodiments of the invention, wherein the magnetic element is floating above the surface of the drive disc.

FIG. 6A shows a view of a driven disc in some embodiments of the invention from a first perspective.

FIG. 6B shows a cross-section of a driven disc in some embodiments of the invention.

DETAILED DESCRIPTION

The present invention provides an apparatus in which the rotation of a driven element is synchronized with the rotation of a driving element by a coupling force between the respective elements that takes effect when their axes are brought into alignment.

Figure 1A:
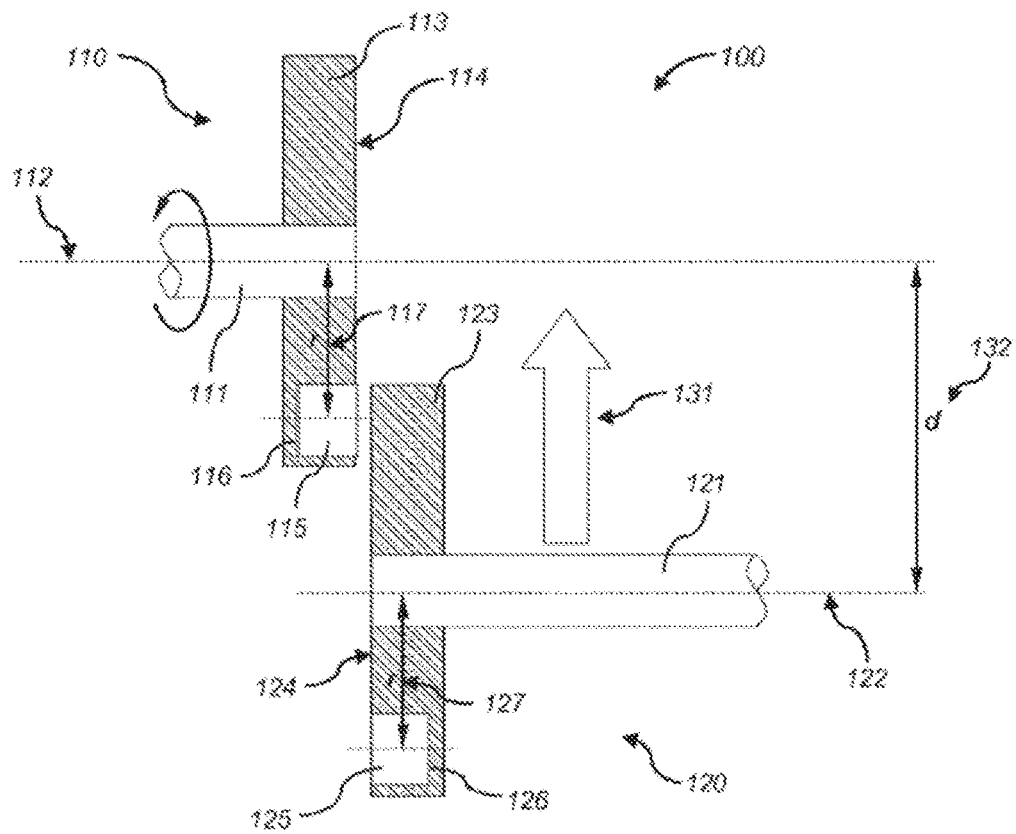
FIG. 1A shows a schematic block diagram of an embodiment of the invention in a configuration immediately before coupling.
Figure 1B:
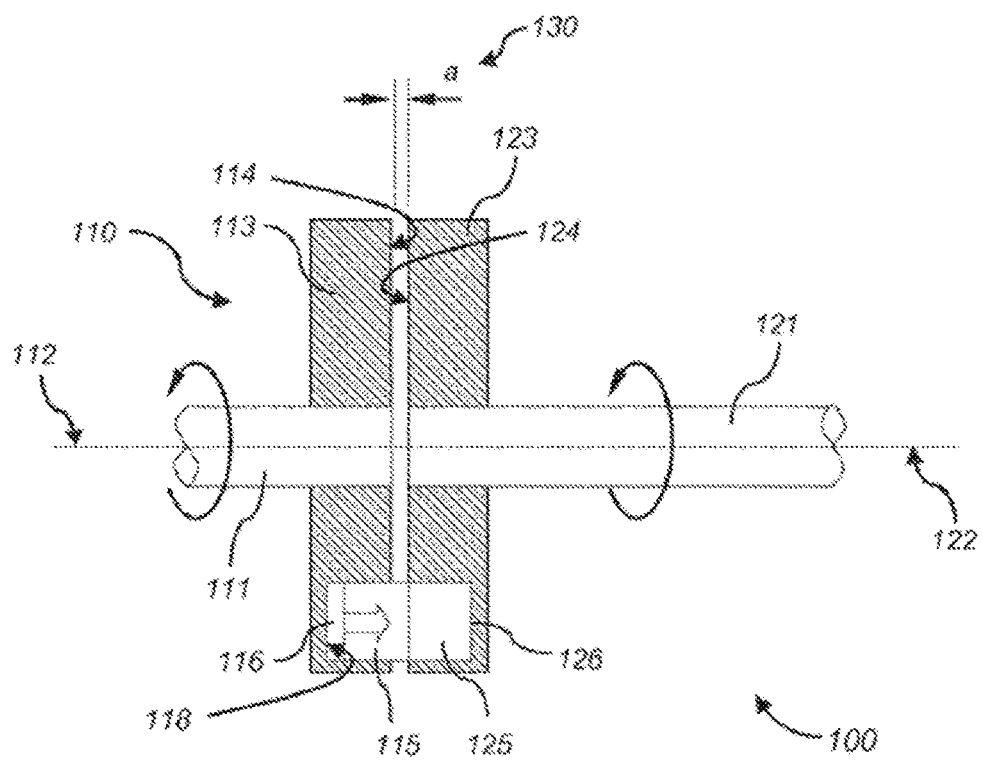
FIG. 1B shows a schematic block diagram of the embodiment of FIG. 1A in a coupled configuration.

FIG. 1A shows an example of a rotational coupling system 100 according to the present invention in a position where a driving element 110 and a driven element 120 are uncoupled from each other. FIG. 1B shows an example of the rotational coupling system of FIG. 1A where the driving element 110 and the driven element 120 are in a coupled drive position. In the drive position, the rotation of the driving element 110 is coupled to the rotation of the driven element 120, causing the two elements to rotate at the same angular velocity.

The driving element 110 comprises a drive shaft 111 having a longitudinal drive axis 112 around which the driving element 110 is able rotate. The drive shaft 111 terminates at one end in a drive disc 113. The drive disc 113 is preferably cylindrical and has a face 114 that lies in a plane perpendicular to the drive axis 112.

The drive disc 113 comprises a non-magnetic material. A cavity 116 is formed in the face 114 of the drive disc 113. The cavity 116 extends a distance into the drive disc 113 and terminates at a recessed face 118 parallel with the face 114 of the drive disc 113.

A magnetic element 115 is disposed in the cavity 116 in the drive disc 113 that is positioned at a radial displacement 117, r, from the drive axis 112. Preferably the magnetic element 115 is disposed towards the edge of the drive disc 113, in order to maximise the torque produced by forces acting on the magnetic element 115.

Examples of magnetic elements suitable for use in the invention include:

1. A permanent magnet, which generates a permanent magnetic field;
2. An electromagnet, which generates a magnetic field when energised;
3. A piece of ferromagnetic material, which experiences an attractive force to a magnet.

All three types of magnetic element are susceptible to a magnetic field, that is, they magnetize in response to an applied magnetic field. Permanent magnets and electromagnets can be used to produce a magnetic field and to induce magnetization in ferromagnetic materials. Of these three, the system may comprise only permanent magnets, only electromagnets or both permanent and electromagnets. The system may further comprise elements of ferromagnetic material in conjunction with either or both types of magnet.

In the shown embodiment, the magnetic element 115 is substantially cylindrical and magnetized along its cylindrical axis. The magnetic element 115 may be disposed in the cavity 116 with the south-pole of the magnetic element 115 positioned towards the surface of the drive disc 113 and the north-pole of the magnetic element 115 positioned towards the recessed face 118 of the cavity 116, or, alternatively, with the north-pole towards the surface of the cavity 116 and the south-pole towards the recessed face 118. The skilled person shall understand, however, that other types of magnetic element may be used in embodiments of the present invention, including magnetic elements in which both the north-pole and south-pole are located at the surface of the drive disc 113. The skilled person shall also understand that wherever magnetic polarities are specified in any embodiments, the invention will not be altered by reversing the magnetic polarities of all magnetic elements in the embodiment.

The magnetic element 115 is retained in the cavity 116 using a retaining element (not shown) that allows the magnetic element 115 to move a small axial distance proud of the face 114 of the drive disc 113 (as is described in more detail with reference to FIG. 5C).

An example of suitable magnetic elements 115 for use in this embodiment are Neodymium magnets commercially available for a wide variety of applications. The choice of magnetic element 115 for the coupling depends primarily on the torque requirement of the application. Such magnets are available in diameters ranging from 5 mm to over 50 mm and thicknesses from 2 mm to over 25 mm. While the smallest of these magnets develop an axial force of around 10N, the larger magnets can generate an axial force of up to 1 kN. The force between two magnets facing each other exhibits a strong dependence on distance between the magnets, approximating to an inverse power law. Versions are available with central fixing holes countersunk on one face for mounting with a single countersunk-head screw.

An important feature of these magnets is the strong radial attractive force that an opposite-sense pair of such magnets produces when facing each other, acting to bring their axes into alignment. Conversely, a same-sense pair of such magnets exhibit a strong radial repulsive force when facing each other.

The drive shaft 111 of the driving element 110 is coupled to a torque input, such as an electric motor (e.g., motor 710 of FIG. 7), that is configured to provide a controllable torque to the drive shaft 111 in order to cause the drive shaft 111 and the drive disc to rotate about the drive axis.

The form of the driven element 120 is substantially a mirror-image of the driving element 110 reflected in a plane perpendicular to the drive axis 112 of the driving element 110. The driven element 120 differs from the driving element 110 in that it is not directly coupled to a torque input and, in this embodiment, that the magnetic element 125 is not able to float outwards of the cavity 126. The driven element 120 is described in more detail below.

The driven element 120 comprises a driven shaft 121 having a longitudinal driven axis 122 around which the driven element 120 is free to rotate. The driven shaft 121 may, for example, be mounted on a carrying device (not shown) having bearings that allow the driven shaft to rotate freely with respect to the carrying device.

The driven shaft 121 terminates at one end in a driven disc 123. The driven disc 123 is preferably cylindrical and has a face 124 that lies in a plane perpendicular to the driven axis 122. A further magnetic element 125 is disposed in a cavity 126 in the driven disc 123 at a radial displacement 127, r, from the driven axis 122. The further magnetic element 125 is retained in the cavity 126 using a retaining element (not shown) that prevents the further magnetic element 125 from moving out of the cavity 126 beyond the face 124 of the driven disc 125.

In one alternative embodiment, the magnetic element 115 of the drive disc 113 is retained so that it cannot move out of the cavity, 116 while the magnetic element 125 of the driven disc 123 is retained such that it is able to move a small axial distance outwards of the cavity 126 such that it becomes proud of the surface 124 of the driven disc 123. In another alternative embodiment, both magnetic elements, 115 and 125, are retained such that they are able to move axially outwards of the respective cavities 116 and 126.

If the magnetic elements, 115 and 125, are unable to contact each other, the axial attractive force between the magnetic elements can put considerable strain on mountings of the driving element 110 and driven element 120. One advantage of providing restraining elements that allow at least one of the magnetic elements, 115 and 125, to move axially out a cavity, is that the magnetic elements are able to contact each other when in the vicinity of each other. This removes the axial force that would be present if both magnetic elements, 115 and 125, were restrained without movement and, thus, reduces stresses in the apparatus. Another important advantage is that, when allowed to contact each other, the maximum possible magnetic force exists between the magnets, which in turn maximises the torque that the coupling can transmit.

The further magnetic element 125 has opposite polarity to the magnetic element 115 in the in the drive disc 113 which causes the magnetic elements, 115 and 125, to be attracted towards each other when positioned in the vicinity of each other. Thus, when the magnetic element 115 of the drive disc 113 has a north-pole at its surface 114, the magnetic element 125 of the driven disc 123 has a south-pole at its surface 124 (and when the magnetic element 115 of the drive disc 113 has a south-pole at its surface 114, the magnetic element 125 of the driven disc 123 has a north-pole at its surface 124.)

The radial displacement 117 of the magnetic element 115 from the driving axis 112 is substantially equal to the radial displacement 127 of the further magnetic element 125 from the driven axis 122 such that, when the driving axis 112 and the driven axis 122 are aligned, the magnetic elements 115 and 125, can be brought into the vicinity of each other by rotation one of the shafts, 111 and 121, around its axis.

When one of the magnetic elements 115 and 125 of the drive disc 113 or the driven disc 123 is formed of a ferromagnetic material, the corresponding magnetic element on the other disc is either a permanent magnet or an electromagnet. When the discs are brought towards alignment with each other, the ferromagnetic material is magnetized by a magnetic field produced by the permanent magnet or electromagnet, causing the magnetic elements of the two discs to experience an attractive coupling force.

In the position shown in FIG. 1A, the driving element 115 and the driven element 125 are uncoupled. In this position, which corresponds to the relative positions of the driving element 115 and the driven element 125 immediately before or after coupling, the drive axis 112 of the driving element 110 is parallel with the driven axis 122 of the driven element 120 but displaced by a perpendicular distance 132, $d$. The faces, 114 and 124, of the driving element 110 and the driven element 120 are separated by an axial separation 130, a, that is small in comparison with d. Furthermore, axial separation 130, a, is typically less than a minimum distance required for forces between the magnetic elements 115 and 125 to affect the rotational motion of the driven element 120; that is, the separation between the faces, 114 and 124, of the driving element 110 and the driven element 120.

In this position, the magnetic elements, 115 and 125, of the driving element 110 and the driven element 120 are at such a distance from one another such that the interaction between the magnetic elements, 115 and 125, is weak and there is no other significant force that acts between the driven element 120 and the driving element 110. The driving element 110 and the driven element 120 are, therefore, effectively decoupled from each other.

It should be understood that the above relative positions of the driving element 110 and the driven element 120 correspond to relative positions immediately before and after coupling. In general, the driving element 110 and the driven element 120 may be moved with respect to each other in a variety of ways that will be determined by the specific embodiment in which they are used. For example, when the driving element 110 and the driven element 120 are at a greater separation, the drive axis 112 and the driven axis 122 may not be parallel to each other and the axial distance between the faces, 114 and 124, may be arbitrarily large.

In the position shown in FIG. 1B, the driving element 110 and the driven element 120 have been moved into a drive position in which the drive axis 112 of the driving element 110 is aligned with the driven axis 121 of the driven element 120. In the drive position, the rotational motion of the driving element 110 is coupled to the rotational motion of the driven element 120 through the attraction between the magnetic elements 115 and 125.

In order to arrive at the drive position, the driven element 120 is moved from the position shown in FIG. 1A in a direction 131 substantially perpendicular to the axes, 112 and 122, until the axes are aligned. In some embodiments, the driven element is mounted on a carrying device that is able to move along a fixed track; in such embodiments, the driven element 120 is moved into and out of the drive position by moving the carrying device along the track into a position where the axis of the driven element 120 is aligned with the axis of the driving element 110.

The coupling of rotational motion from the driving element 110 to the driven element 120 occurs spontaneously (i.e. without active control) and automatically when their axes, 112 and 122, are brought substantially into alignment with each other with their faces, 114 and 124, being separated with a small axial distance 130, $a$. This process is described below.

As the driven element 120 approaches the driving element 110 in a direction perpendicular to their axes, 112 and 122, the distance between the magnetic elements 115 and 125, decreases and, as a result, the attractive force between the magnetic elements increases. The driving element 110 may or may not be controlled to rotate at this time. If the driving element 110 is rotating the magnetic element 115 of the drive disc 113 approaches the vicinity of the magnetic element 125 of the driven disc 123 by sweeping through an annular region at the radius, r, until it approaches the position in which the magnetic element 125 of the driven disc 123 is located. Preferably, the timing of the rotation of the driving element 110 and the approach of the driven element 120 is configured such that the magnetic element 125 of the driven disc 123 and the magnetic element of the drive disc 113 are close to each other at the time that the driven element 120 arrives in the drive position. This increases the efficiency of the coupling process, minimising the coupling time while the driving element 110 searches for the magnetic element 125 of the driven element 120. If the driving element 110 is not rotating as the driven element 120 approaches the drive position, the elements 110, 120 may or may not couple initially. If the driven element 120 is rotating, for example if it is free-wheeling following a recent disengagement for a previous drive device, the magnetic element 125 of the driven disc 123 will sweep through an annular region at the radius r until it approaches the position in which the magnetic element 115 of the drive disc 113 is located, whereupon the two discs 113, 123 will become coupled.

If both the driven element 120 and the driving element 110 are not initially rotating, whether the two discs 113, 123 become coupled depends on their relative orientations and the strength of attraction of their magnetic elements, as to whether the magnetic elements 115, 125 come close enough together as the driven element 120 approaches the driving element 110 to draw the driven disc 123 into alignment with the drive disc 113. Once the drive disc 113 is controlled to rotate, successful coupling does not depend on the initial relative orientations of the drive disc 113 and driven disc 123 as they approached each other. Although FIGS. 1A and 1B indicate a particular orientation, any initial orientation will result in the same final coupled position, albeit details of the angular motion of the driven disc as it is captured by the driven disc will vary depending on the initial relative positions, speed of rotation and speed of approach of the two discs.

Because the axial distance, a, between the magnetic elements is small in comparison to the perpendicular distance, d, when the attractive force between the magnetic elements becomes significant, the attractive force on each magnetic element is substantially perpendicular to the axes of rotation of the driven element 120 and the driving element 110 (i.e. a substantial component of the attractive force between the magnetic elements, 115 and 125, lies in the planes of the faces 114 and 124 of the discs 113 and 123). When the rotational axes of the drive disc and the driven disc are substantially aligned, and when the distance between the magnetic elements, 115 and 125, is small compared to the radius, r, at which they are respectively positioned from their respective rotational axes, the separation between the magnetic elements is substantially tangential to the rotational axes, 112 and 122. Thus, at this point the magnetic attraction force between the magnetic elements causes a large torque on each disc around their respective rotational axes, which causes the driven disc 123 to rotate towards a position where the magnetic elements are aligned.

As the two magnetic elements, 115 and 125, become aligned, the distance between the magnetic elements decreases to the order of the axial distance, a. At this point, the attractive force between the magnetic elements, 115 and 125, has a significant axial component, which causes the magnetic element 115 in the drive disc 113 to float out of the cavity 116, such that the magnetic element 115 extends beyond the surface 114 of the drive disc 113. The degree of axial motion of the magnetic element 115 allowed by the retaining element is sufficient to allow the surface of the magnetic element 115 to contact the surface 124 of the driven disc. This provides a frictional coupling force between the driving element 110 and the driven element 120 in addition to the magnetic coupling force provided by the attraction between the magnetic elements, 115 and 125. The combination of the frictional coupling force and the magnetic coupling force causes the driven element 120 to rotate in synchronization with the driving element 110 with the magnetic element 125 in the driven element 120 aligned with the magnetic element 115 in the driving element 110.

Because the drive disc 113 is provided with only one magnetic element 115 and the driven disc 123 is provided with only one magnetic element 125, there is only one alignment between the respective discs in which the magnetic elements are able to couple to each other; this occurs when the magnetic elements of both discs lie in a line parallel to the drive axis 112 and the driven axis 122. This relative orientation is maintained when the drive disc 113 and the driven disc 123 are co-rotated in the same direction by the same angle. The absolute orientation of the drive disc 113 and the driven disc 123 may be defined by an arbitrary starting position. For example, the 0 degrees orientation of each disc may be defined as the orientation in which the magnetic element is vertically above and horizontally aligned with the axis of rotation (the "twelve o'clock" position). Other disc angles may be defined by a degree of rotation from the 0 degrees orientation around the axis of rotation. The directions of rotation of the two discs should be defined such that a positive rotational displacement of both discs by an equal amount maintains the relative orientations of the magnetic elements. The coupling of the drive disc 113 to the driven disc 123, therefore, maintains a substantially constant angular displacement between the two discs. If the rotational orientation of both discs is defined such that the discs have equal angular displacement in the coupled position, the coupling maintains an angular displacement between the discs of approximately 0 degrees.

In the absence of a significant load torque on the driven disc 123, the angular displacement between the discs will be approximately 0 degrees. An angular displacement will occur if the driven disc 123 is subject to a load torque that exceeds a first threshold determined by the static friction force between the magnetic elements of the drive disc 113 and the surface of the driven disc 123. At a load torque above this threshold, the discs will remain coupled but a small angular displacement between them will increase with load torque up to a second threshold at which the radial component of the magnetic attraction between the magnetic elements is exceeded. This second threshold determines the maximum torque that the coupling can transmit. Provided the maximum torque is not exceeded, the two discs will remain aligned at the predetermined rotational orientation, which includes the range of angular displacement over which the discs remain coupled.

Because the magnetic elements, 115 and 125, in the two discs are aligned, a control system that is aware of the orientation of the drive disc 113 (defined, for example, with respect to the orientation of the magnetic element 115) is able to infer the orientation of the driven disc 125. In applications where the orientation of the driven element 120 is important, this allows a control system to infer the orientation of the driven element 120 through control of the driving element 110, rather than having to measure the driven element separately. In applications where very accurate knowledge is necessary of the orientation of the driven element in the presence of a significant load torque, an angle encoder system on the driven element may be advantageously employed.

Disengagement of the driven element 120 from the driving element 110 is by applying a shear force between the drive discs 113 and the driven disc 123 that is greater than the combination of magnetic and friction forces keeping the discs aligned. In typical applications this will be provided by an actuator or linear motion stage or similar that conveys the driven element 110 in a plane orthogonal to the axes of the discs.

Depending on the arrangement of magnetic elements on the discs and the angle of the coupling at the moment of disengagement, the act of disengagement may induce an additional torque on the discs. For a given arrangement of magnetic elements, the disengaging motion of the driven element 120 can be configured to either accelerate or decelerate the driven disc 123 as it disengages and can be used to advantage to compensate for deceleration of the driven disc due to drag and friction and consequent slippage of angular position between drive stations.

Alternatively or additionally, the deceleration of the driven disc 123 between drive stations may be compensated by accelerating the rotation of the driving element 110 prior to disengagement of the driven element 120 to impart an angular acceleration to the driven element 120. The additional angular velocity of the driven disc 123 in comparison with the speed of rotation at the drive station is chosen to match a predicted loss of angular velocity of the drive disc 123 between drive stations due to friction and air resistance.

In some embodiments, the drive disc 113 and the driven disc 123 are provided with more than one magnetic element 115. Additional magnetic elements 115 can be used to increase the torque that the coupling can transmit and can also increase the capture range and capture speed of the coupling. FIGS. 2A-D show a series of coupling discs comprising one or more magnetic elements 115. For simplicity, the discs shown in FIGS. 2A-D are labelled and described as drive discs 113. It should be understood, however, that the corresponding driven discs 123 comprise the shown features in a mirror-image as reflected through a plane parallel with the face of the discs 113. Where, however, the magnetic element 115 are shown in the drive disc 113 with a surface facing north-pole 115a, this should be replaced in the driven disc 123 with a surface facing south-pole 115b (and vice versa).

FIG. 2A shows a drive disc 113 comprising one magnetic element 115a disposed in the face 114 of the disc 113 towards the periphery of the disc 113. This drive disc 113 is the same as the drive disc 113 shown in the embodiment of FIG. 1.

FIG. 2B shows a drive disc 113 comprising two magnetic elements. A first magnetic element 115a is disposed towards the edge of the disc in the position of the magnetic element 115a in FIGS. 1 and 2A. A second magnetic element 215a is disposed radially inwards from the first magnetic element 115a. Both magnetic elements have the same polarity. The provision of two such magnetic elements increases the magnetic coupling between the drive disc 113 and the driven disc 123, thus increasing the torque transmitted between the discs and the speed at which the rotational alignment of the discs takes place.

FIG. 2C shows a drive disc 113 comprising two magnetic elements. The arrangement of the magnetic elements is similar to that of the embodiment shown in FIG. 2B, except that the magnetic polarities of the two magnetic elements, 115a and 215b, are opposite to each other. The magnetic field that results from this dipole arrangement will tend to be higher and more localised than for the arrangement of FIG. 2B, which will reduce the distance that the discs need to be separated to become decoupled from one another without reducing the coupling force when engaged.

FIG. 2D shows a drive disc 113 comprising four magnetic elements. Two magnetic elements, 115a and 215a, of the same polarity are radially displaced from one another, as in the embodiment of 2B. A further two magnetic elements, 115b and 215b, of the opposite polarity are provided on the opposite side of the disc 113 to the first two magnetic elements. The four magnetic elements lie on a diameter that passes through the axis of the drive disc 113.

The provision of four magnetic elements provides a stronger coupling force than embodiments comprising fewer magnetic elements of the same strength. An additional advantage of this arrangement occurs when the axes of drive disc 113 and the driven disc 123 are brought into alignment while the discs are at 180 degrees rotational displacement with respect to each other. In this case, the mutually attracting magnetic elements on the two discs are positioned as far from each other as possible with the axes, 112 and 122, of the discs being aligned. Not only is the coupling force between the magnetic elements at a minimum due to their separation, the direction of the coupling force passes through the axes, 112 and 122, of the discs, 113 and 123, and does not, therefore, produce a rotating torque. By providing additional magnetic elements of the opposite polarity positioned radially opposite to the first two magnetic elements, a strong rotational coupling between the discs is gained, even when the discs are rotated 180 degrees with respect to each other, due to the unstable repulsive force between the magnetic elements of the same polarity on the two discs.

Each of the embodiments shown in FIGS. 2A-D advantageously comprises an arrangement of magnetic elements having no rotational symmetry (other than through an integer of complete revolutions). If magnetic elements are provided in an arrangement having rotational symmetry, by providing two magnetic elements of the same polarity on radially opposite sides of the disc 113 for example, it will be possible for the drive disc 113 and the driven disc 123 to couple in more than one orientation—the number of possible orientations being equal to the order or rotational symmetry present in the arrangement of magnetic elements. If there is more than one orientation in which the drive disc 110 and the driven disc 120 are able to couple to each other, it is not possible to derive the orientation of the driven disc 120 from the orientation of the drive disc 110. By providing magnetic element arrangements with no rotational symmetry, the embodiments shown in FIGS. 2A-D each enable coupling systems in which the orientation of the driven disc 123 can be derived from the orientation of the drive disc 113.

FIGS. 3 and 4 show further embodiments of the present invention comprising a drive disc 313 and a driven disc 323 in which the magnetic elements are arranged in an advantageous pattern.

The applicant has found that the capture range (i.e. the rotational offset between the drive disc and the driven disc at which the magnetic forces are able to synchronize) of the coupling and the settling time (the time taken for the drive disc and the driven disc to achieve synchronization when in the drive position) of the coupling are greatly influenced by the arrangement of magnetic elements in the discs. An arrangement of magnetic elements that is both rotationally asymmetric and reflectively asymmetric, as shown in FIG. 3, have been found to be beneficial in drawing the coupling into rotational alignment when the position of the driven disc 323 approaches the drive disc 313 in a lagging position—that is, with the rotational orientation of the driven disc 323 being behind that of the drive disc 313 in the direction of rotation.

In FIG. 3, the drive disc 313 comprises a first magnetic element 115 a and a second magnetic element 215 a of the same polarity positioned along a radial line. A third magnetic element 315 b of opposite polarity is disposed at a position ahead (in the direction of rotation of the disc when driven) of the first and second magnetic elements. The arrangement of magnetic elements (e.g., 125a, 225a, 325b) in the driven disc 323 is a reflection of the drive disc 313 in the plane parallel the face of the disc with polarities of the magnetic elements being reversed.

When the driven disc 323 in this embodiment approaches the drive disc 313 in a lagging position, the third magnetic element 325b of the driven disc 323 experiences a repulsive force from the first 115a and second 215a magnetic elements of the drive disc 313. This repulsive force can provide an additional rotation torque in the direction of rotation in comparison to other arrangements, thus allowing the driven disc 323 to catch up with drive disc 313.

A similar arrangement is shown in FIG. 4, in which a fourth magnetic element 335b is positioned on the driven disc ahead of the third magnetic element 325b and having the same polarity as the third magnetic element 325b. This arrangement has been found to be beneficial in the printing apparatus described later with reference to FIG. 7. It provides an attractive force from magnetic element 315b of the drive disc to 335b of the driven disc which retards overshoot of the position of the driven disc and reduces settling time in this particular method of operation.

FIGS. 5A-C show an example of the drive disc 113 of FIG. 1 from different perspectives.

FIG. 5A shows the drive disc 113 in plan.

In this embodiment, the drive disc 113 has a circular cross-section and comprises a machined aluminium disc of diameter, w, 57 mm and thickness, t, 10 mm. The disc has an integrally formed hub and is drilled through its centre with a 10 mm diameter through-hole 511 and a grub-screw to fix the drive disc 113 to a shaft 111.

In other embodiments, the drive disc 113 may have a non-circular cross-section, such as an elliptical cross section or a rectangular cross-section. In some embodiments the drive disc 113 may be formed from a material other than aluminium. Preferably the drive disc 113 is formed from a non-magnetic material. The skilled person will understand that the dimensions of the drive disc 113 may be chosen according to the requirements of the application in which the invention is used.

FIGS. 5B and 5C shows the drive disc 113 of FIG. 5A from a side-on view in section, from which the position of the magnetic element 115 can be more clearly seen.

The magnetic element 115 is disposed in a cavity 116 set into the face 114 of the drive disc 113. In this example, the magnetic element 115 has a diameter of 10 mm and a thickness of 5 mm. In some examples the magnetic element has a diameter of 20 mm. The magnetic element 115 comprises a central countersunk drilling to provide for mounting of the magnetic element 115 within the cavity 116 using a restraining element 119. In this example, the restraining element is a single screw 119.

The cavity 116 is dimensioned such that it extends into the face 114 of the drive disc 113 to accommodate the magnetic element 115 with a clearance fit. The cavity 116 has a depth approximately equal to the thickness of the magnetic element 115, so that the outer surface of the magnetic element 115 is substantially flush with the face 114 of the drive disc 113 when fully inserted into the cavity 116 (as shown in FIG. 5B).

The retaining screw 119 is adapted to secure the magnetic element 115 in the cavity, but allows the magnetic element to move axially out of the cavity 116 by approximately 1 mm to become up to 1 mm proud of the disc face 114 (as shown in FIG. 5C).

In other embodiments, the magnetic element 115 may be constrained such that it is able to move out of the cavity 116 by a different axial distance. Preferably, the magnetic element 115 is able to move by a sufficient distance to contact a magnetic element 125 in a driven disc when aligned in a drive position.

One or more springs (not shown) may be disposed between the magnetic element 115 and the rear surface of the cavity in order to bias the magnetic element 115 inwards into the cavity into a rest position in which the front surface of the magnetic element does not protrude from the surface of the disc 114. This ensures that the magnetic element 115 does not collide with the driven disc as they approach each other.

The skilled person shall understand that the above drive disc 113 can be adapted to comprise more than one magnetic element 115, such as those shown in FIGS. 2B-D, 3 and 4.

In one variant of the drive disc 113 shown in FIG. 5, three magnetic elements are disposed in the drive disc 113 being spaced equally by 120° from the other two magnetic elements. Each magnetic element is independently floating and sprung. The normal driven disc (having one magnetic element) may engage with it in one of three positions corresponding respectively to the magnetic element of the driven disc being aligned with each of the magnetic elements of the drive disc 113. In this example, the unique alignment position is foregone in favour of a faster engagement. This embodiment is advantageous in the printing apparatus described later with reference to FIG. 7, in certain processing stations in which a unique alignment position is unnecessary, the drive speed is slower than at the print stations and the driven discs approach with an uncontrolled orientation, such as a camera inspection station or an over varnishing station.

FIGS. 6A and 6B show an example of the driven disc 123 of FIG. 1 from different perspectives.

The driven disc 123 is substantially a mirror-image of the drive disc 113 as reflected through a plane parallel to the face 114 of the disc 113. Driven disc 123 of FIG. 6A includes through-hole 521. The driven disc 123 differs from the drive is in that the magnetic element 125 is retained in the cavity 126 with its axial position fixed so that it cannot float above the surface. The polarity of the magnetic element 125 is chosen to be opposite to that of the corresponding magnetic element 115 on the drive disc 121.

The magnetic element 125 in the driven disc 123 is set flush or just sub-flush with the disc face 124 and secured with a screw 129 so that it cannot float in the cavity 126. A potting compound is added over and around the magnetic element 125 in the cavity 126 to fill any gaps or voids, and the surface of the disc 123 lapped to a smooth finish forming a flat surface 124.

The skilled person shall understand that the above driven disc 123 can be adapted to comprise more than one magnetic element 125, such as those shown in FIGS. 2B-D, and FIG. 3. Furthermore, the driven disc 123 may also comprise a different number of magnetic elements 125 to the drive disc 113, such as in the example shown in FIG. 4.

In some embodiments, the driven disc 123 comprises a surface layer of a material that covers the face 124 of the driven disc that faces the drive disc 113. The material may be a brake pad material, such as FTL175 supplied by Friction Technology Ltd. The material increases the friction between the driven disc 123 and the magnet of the drive disc 113, which improves coupling stability and also reduces wear of the surfaces.

The skilled person shall also understand that the shapes of the driving element and driven element are not constrained to be circular discs. While a disc has been described in this example, other possibilities fall within the scope of the invention for either or both of the driving and the driven element. These include any shape that can support the magnetic elements in the desired arrangement, and include one or more radial arms, a triangle, square or other polygon, an oval, ellipse, or a more complex shape. The driving and driven elements may include regions of no material, e.g. drillings or voids and/or their thickness may be selectively reduced, e.g., to reduce mass. The driving and driven elements may be different shapes. A wide range of materials may be used for the manufacture of the driving and driven elements, including non-magnetic metals, polymers, composites, etc.

Figure 7:
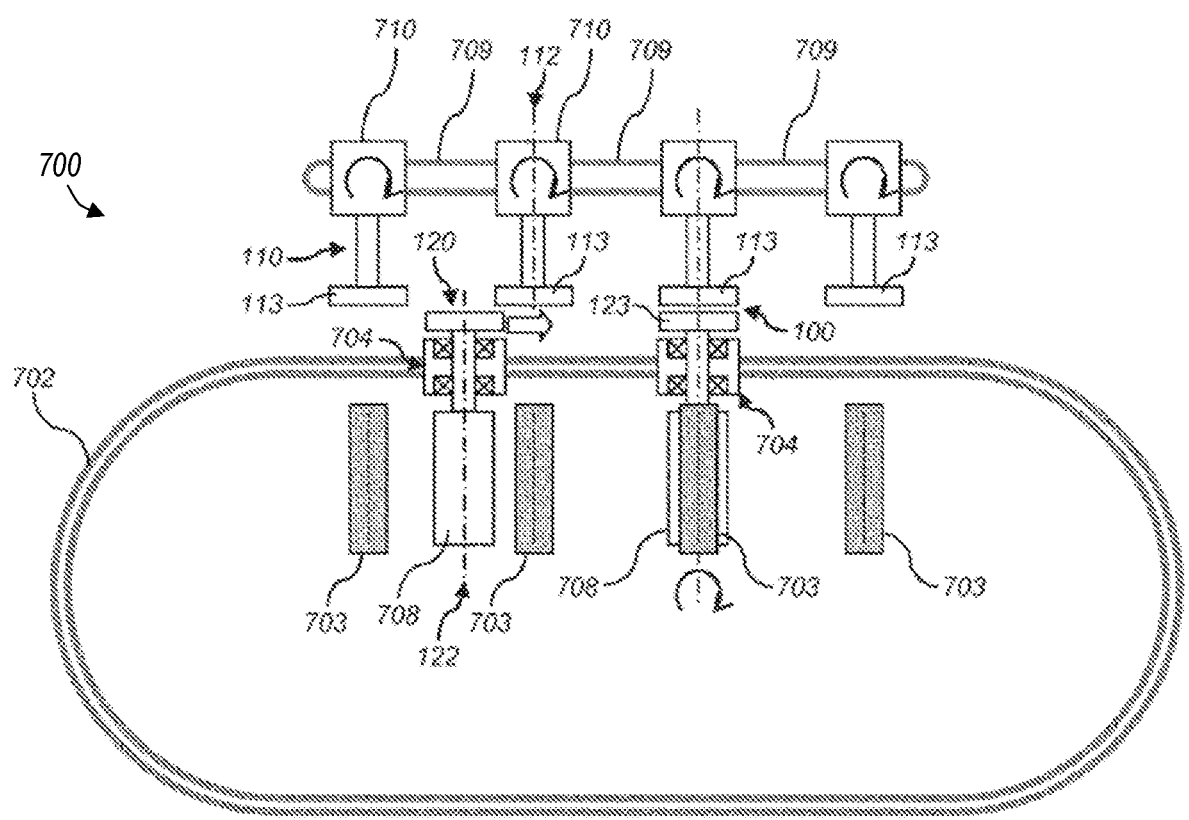
FIG. 7 shows a schematic block diagram of a printing system comprising a plurality of coupling systems according to embodiments of the invention.

FIG. 7 shows an example of a printing system 700 for cylindrical containers comprising four of the magnetic coupling apparatuses 100 of the present invention.

In this printing system, the passive driven element 120 is adapted to hold a container to be printed on 708. The driven elements 120 are carried along a track 702 into the vicinity of print heads 703 configured to print onto the surfaces of the containers 108. Disposed along the track 703 are a series of driving elements 110 that couple to the driven elements 120 in the vicinity of the printhead 703, allowing the containers 108 to be rotated while being printed upon.

Each driven element 120 is adapted to carry a container 708 such that the longitudinal axis of the container 708 is parallel with the driven axis of the driven element 120. Each driven element 120 is mounted to a respective moving carriage 704 device via bearings 705 that allow the driven element 120 to rotate freely about its central axis with respect to the carriage 704. Rotation of the driven element 120 thereby causes an attached container 708 to be rotated about its central axis.

Each moving carriage device 704 is mounted via a linear bearing system (not shown) to the track 702. The track 702 forms a closed path around which a carriage 704 is free to move, and which guides the motion of each carriage 704 with high precision.

Carriages 704 are driven along the track 702 by a magnetic linear motor system. Carriages 704 carry permanent magnets (not shown) that couple magnetically to a system of electromagnets spaced around the track 702. The electromagnets in the track 702 are driven electrically to propel carriages 704 along the track 702. A position sensing system measures the position of each carriage 704 on the track 702 and a control device is used to independently control the position, velocity and acceleration of each carriage 704 on the track 702. An example of such a track 702 is the iTRAK, which is produced commercially by Rockwell Automation.

The carriages 704 and driving elements 110 are configured such that, when a carriage 704 is moved into a position where a container 708 may be printed on by a printhead 703, the driven axis 122 of the driven element 120 of the carriage 704 is brought into alignment with the drive axis 112 of a rotating driving element 110. The driving element 110 rotationally couples to the driven element 120 as described in the above sections of the description, thus allowing the rotational position of the container 708 to be controlled by the driving element 120.

The printing apparatus 700 comprises four print stations, each of which comprises at least one printhead 703, at which individual colour separations of an image are printed onto the surface of the container 708. The printing process at each print station involves one or more complete revolutions of the container 708 during which time the container 708 is rotated at a constant angular velocity by the driving element 110 via the magnetic coupling. A plurality of containers 708 may be printed in parallel. In some embodiments, one container 708 is located in each print station during printing. The rotation of each container 708 in each print station is synchronised such that the start time of the printing process is substantially the same at each print station. Similarly, the end time of the printing process (i.e. the time at which the container has undergone the one or more revolutions) is substantially the same at each print station. The rotating drive at the print stations is provided from a single motor 710 connected via belts 709 to the driving element 110 of each rotating coupling 100 at the respective print stations.

During the time that a carriage 704 is located in a print station, the angular position of the container is measured from a high-resolution optical encoder ring attached to the driven element by a separate non-contact optical read head mounted at the print station. This provides timing signals to control the ejection timing of the printhead located at the print station.

At the end of the one or more revolution print process, each carriage 704 is translated to the next print station where the next colour separation will be printed, overlaying in the same position as the previous separation. During this translation, the rotating couplings 100 disengage as the drive discs 113 and the coupling discs 123 of the respective couplings are separated by the movement of the carriages 704 orthogonal to the axes of the discs. The rotating drive continues to rotate at the same constant angular velocity, while the rotation of a container 708 begins to decelerate once its coupling is disengaged.

In order to maximise the throughput of the printing apparatus 700, it is preferable that translation between stations is completed within one rotation of the driving element 110 and that a container 708 is resynchronised to the driving element 110 on reaching the second station without losing a revolution with respect to the driving element 110. This requires that the rotational angle of the driven disc 123 with respect to the drive disc 113 as it approaches the second station is within the capture range of the coupling, and that the slip in position can be recovered, and the speed stabilised, by the time of the start of print at the second station.

The slip in position resulting from deceleration of the container 708 between driving elements 110 can be compensated by controlling synchronisation between rotational position of the discs and linear translation of the carriages 704 to provide some angular acceleration as the coupling disengages. Such angular acceleration results if the linear translation produces a torque on the driven disc 123 in the same direction that the discs 113, 123 are rotating at the time of disengagement. The torque results if the combined attractive force between the magnetic elements of the two discs 113, 123 acts at a position that is offset relative to the central axis of rotation 112, 122 of the discs 113, 123 with a component that is perpendicular to the direction of linear translation at the time of disengagement. This produces a torque that accelerates or decelerates the driven disc 123, dependent on which side of the central axis 112, 122 the point at which the combined attractive force acts. Furthermore, the magnitude of the torque (as well as its direction) depends on the orientation of the coupled discs 113, 123 at the time of disengagement as this will affect the magnitude of the said perpendicular component. It has been found that the rotation of the driving disc 113 can be synchronised with the translation of the carriage 704 such that the orientation at the time of disengagement is always such as to accelerate the driven disc 123 by an amount that substantially balances the deceleration of the container 708 that occurs while moving the carriage 704 between stations.

Alternatively or additionally, the deceleration of the driven disc between drive stations may be compensated by accelerating the rotation of the driving element prior to disengagement of the driven element to impart an angular acceleration to the driven element.

Prior to the first drive station, the driven element may be pre-rotated such that it is rotating in the required direction as it approaches the first drive station. This speeds up the coupling process of the driven element to the first driving element in the drive station. Pre-rotation may be performed by engaging the circumferential surface of the driven disc tangentially with a fixed rail or pad as the carriage moves along the track towards the drive station, causing the driven element to rotate about its axis.

The specific arrangement of magnetic elements in the drive disc 113 and the driven disc 123 is the same as that shown in FIG. 4. This arrangement has been found to provide good performance in tests of the prototype printing apparatus, in locking on to a drive rotation speed of 300 rpm (the rated speed of the printing apparatus) both from a standstill and when moving between adjacent driving elements 110 separated by 125 mm in less than 200 ms.

The invention claimed is:

1. A system for transmitting rotational motion between a driving element and a driven element, the system comprising:
    a driving element that is coupled to a torque input that causes the driving element to rotate about a drive axis, the driving element comprising a first magnetic element;
    a driven element that is configured to rotate about a driven axis, the driven element comprising a second magnetic element;
    wherein both the first magnetic element and second magnetic element are susceptible to a magnetic field, and at least one of the first and second magnetic element produces a magnetic field;
    wherein the driving element and the driven element are configured such that, when in a drive position in which the drive axis is aligned with the driven axis, a magnetic interaction between the first magnetic element and the second magnetic element couples the rotational motion of the driving element and the rotational motion of the driven element,
    wherein the coupling between the driving element and the driven element causes the driving element and the driven element to be coupled at a predetermined rotational orientation with respect to each other;
    wherein the driven element is mounted on a carrying device that is transportable along a path, wherein the path requires that the carrying device moves the driven element into and out of the drive position in a direction perpendicular to the drive axis of the driving element,
    wherein moving the driven element out of the drive position in said direction perpendicular to the drive axis of the driving element causes decoupling of the rotational motion of the driven element from the rotational motion of the driving element.

2. The system of claim 1, wherein the predetermined rotational orientation is a unique rotational orientation of the driving element with respect to the driven element in which the first and second magnetic elements are aligned along an axis parallel with the drive axis and the driven axis.

3. The system of claim 1, wherein at least one of the first magnetic element and the second magnetic element is a permanent magnet.

4. The system of claim 1, wherein at least one of the first magnetic element and the second magnetic element comprises a ferromagnetic material.

5. The system of claim 1, wherein the first magnetic element is disposed in the driving element at a radial distance, r, from the drive axis and the second magnetic element is disposed in the driven element at the same radial distance, r, from the driven axis.

6. The system of claim 1, wherein at least one of the first magnetic element or the second magnetic element is disposed in a cavity in the driving element or the driven element respectively.

7. The system of claim 6, wherein the second magnetic element is retained in the cavity by a retaining element that allows the second magnetic element to move in a direction parallel to the driven axis, thereby allowing the second magnetic element to move so as to contact a surface of the driving element when in the drive position.

8. The system of claim 7, wherein the first magnetic element is retained in the cavity by a retaining element that allows the first magnetic element to move in a direction parallel to the drive axis, thereby allowing the first magnetic element to move so as to contact a surface of the driven element when in the drive position.

9. The system of claim 1, wherein the driving element and the driven element each comprises a plurality of magnetic elements that are arranged such that the positions and/or magnetic polarities of the magnetic elements are asymmetrical around the drive axis and driven axis respectively, thereby providing one predetermined rotational orientation.

10. The system of claim 9 wherein at least one further magnetic element is positioned on at least one of the driving element or the driven element with no corresponding further magnetic element on the other of the driving element or the driven element.

11. The system of claim 9, wherein a respective position of each magnetic element on the driving element aligns with a corresponding respective position of a corresponding magnetic element on the driven element while the driving element and the driven element are aligned in the one predetermined rotational orientation.

12. The system of claim 1, wherein the driven element is one of a plurality of driven elements that are moveable such that each driven element sequentially couples and decouples with the driving element.

13. The system of claim 1, wherein the driving element is one of a plurality of driving elements, and wherein the driven element may sequentially move into drive positions respectively associated with each of the driving elements such that the rotational motion between the driving elements and the driven element is coupled in the respective drive positions.

14. The system of claim 1, wherein the driving element comprises a drive disc in which the first magnetic element is disposed, and wherein the driven element comprises a driven disc in which the second magnetic element is disposed.

15. The system of claim 1, wherein the drive position is fixed.

16. The system of claim 1, where the drive position is moveable in a direction parallel to the path of the carrying device to enable the driven element to remain coupled to the driving element during part of its movement along the path.

17. The system of claim 1, wherein the driving element comprises a first face that lies substantially in a plane perpendicular to the drive axis, and the driven element comprises a second face that lies substantially in a plane perpendicular to the driven axis, and wherein, in the drive position, the first face and the second face are substantially parallel and oriented in a face-to face relationship.

18. The system of claim 17, wherein the first magnetic element and/or the second magnetic element are magnetized such that, when the driving element and the driven element are in the drive position, the first and second magnetic elements attract each other.

19. The system of claim 1, wherein at least one of the first magnetic element and the second magnetic element is an electromagnet.

20. A printing apparatus, comprising:
at least one printing station comprising a print head; and
at least one system according to claim 1.

21. A method of operating a system comprising a driving element that is coupled to a torque input that causes the driving element to rotate about a drive axis, the driving element comprising a first magnetic element; a driven element that is configured to rotate about a driven axis, the driven element comprising a second magnetic element; wherein both the first magnetic element and second magnetic element are susceptible to a magnetic field, and at least one of the first and second magnetic element produces a magnetic field; wherein the driving element and the driven element are configured such that, when in a drive position in which the drive axis is aligned with the driven axis, a magnetic interaction between the first magnetic element and the second magnetic element couples rotational motion of the driving element and rotational motion of the driven element, wherein the coupling between the driving element and the driven element causes the driving element and the driven element to be coupled at a predetermined rotational orientation with respect to each other, and wherein the driven element is mounted on a carrying device that is transportable along a path, wherein the path requires that the carrying device moves the driven element into and out of the drive position in a direction perpendicular to the drive axis of the driving element;
the method comprising:
rotating the driving element around the drive axis using the torque input;
moving the driven element in the direction perpendicular to the drive axis into the drive position, thereby causing the rotational motion of the driven element to be coupled with the rotational motion of the driving element; and
moving the driven element out of the drive position in the direction perpendicular to the drive axis, thereby decoupling the rotational motion of the driven element from the rotational motion of the driving element.

22. The method of claim 21, wherein the rotational motion of the driven element is coupled with the rotational motion of the driving element at least during a printing operation.

23. The method of claim 21, further comprising:
rotating a second driving element around a second drive axis using the torque input; and
moving the driven element into a second drive position in which the driven axis is aligned with the second drive axis, thereby coupling the rotational motion of the driven element to the rotational motion of the second driving element.

24. The method of claim 23, wherein the moving of the driven element out of the drive position in a direction perpendicular to the drive axis is synchronized with the rotational motion of the driving element such that the moving the driven element out of the drive position imparts an angular acceleration to the driven element.

25. The method of claim 24, wherein the angular acceleration imparted to the driven element compensates for its deceleration between drive positions due to drag and friction.

26. The method of claim 23, wherein prior to moving the driven element out of the drive position, the rotation of the driving element is accelerated to impart an angular acceleration to the driven element.

27. The method of claim 21, wherein rotational motion is imparted to the driven element prior to coupling with the driving element.

28. The method of claim 27, wherein the rotational motion is imparted by rolling contact of the driven element with a stationary pad or rail.

29. A printing system comprising a driving element that is disposed at a stationary location beside a track and a driven element that is configured to carry an object to be printed on and to move along the track, wherein:
the driving element is coupled to a torque input that causes the driving element to rotate about a drive axis, the driving element comprising a first magnetic element;
the driven element is configured to rotate about a driven axis, the driven element comprising a second magnetic element; wherein
both the first magnetic element and second magnetic element are susceptible to a magnetic field, and at least one of the first and second magnetic element produces a magnetic field;
wherein the driving element and the driven element are configured such that, when in a drive position in which the drive axis is aligned with the driven axis, a magnetic interaction between the first magnetic element and the second magnetic element couples a rotational motion of the driving element and a rotational motion of the driven element; and
wherein the driven element is movable in a linear translation along the track in a direction perpendicular to the drive axis of the driving element in order to move the driven element out of the drive position, thereby to decouple the rotational motion of the driven element from the rotational motion of the driving element.

* * * * *

UNITED STATES PATENT AND TRADEMARK OFFICE
CERTIFICATE OF CORRECTION

| | |
|---|---|
| PATENT NO. | : 11,298,933 B2 |
| APPLICATION NO. | : 16/346199 |
| DATED | : April 12, 2022 |
| INVENTOR(S) | : John Lawton Sharp et al. |

It is certified that error appears in the above-identified patent and that said Letters Patent is hereby corrected as shown below:

In the Claims

In Column 17 (Claim 1), Lines 57-58, please delete "element," and insert -- element; and --.

Signed and Sealed this
Twenty-fourth Day of May, 2022

Katherine Kelly Vidal
*Director of the United States Patent and Trademark Office*